US011633822B2

(12) United States Patent
Koibuchi et al.

(10) Patent No.: US 11,633,822 B2
(45) Date of Patent: Apr. 25, 2023

(54) FASTENING DEVICE

(71) Applicant: HONDA MOTOR CO., LTD., Tokyo (JP)

(72) Inventors: Yuta Koibuchi, Tochigi-ken (JP); Masakazu Adachi, Tochigi-ken (JP); Shinya Kaiga, Tochigi-ken (JP); Hiroaki Masumori, Tochigi-ken (JP); Nobuyuki Kouda, Tochigi-ken (JP); Taichi Hayashida, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 479 days.

(21) Appl. No.: 16/843,994

(22) Filed: Apr. 9, 2020

(65) Prior Publication Data
US 2020/0324379 A1    Oct. 15, 2020

(30) Foreign Application Priority Data

Apr. 15, 2019    (JP) .............................. JP2019-076753

(51) Int. Cl.
*B23Q 5/32*    (2006.01)
*B23Q 7/10*    (2006.01)
(Continued)

(52) U.S. Cl.
CPC .............. *B23Q 5/32* (2013.01); *B23Q 3/005* (2013.01); *B23Q 7/046* (2013.01); *B23Q 7/106* (2013.01); *B23Q 7/14* (2013.01)

(58) Field of Classification Search
CPC ......... B23P 19/06; B23Q 7/046; B23Q 7/106; B23Q 5/32; B23Q 5/326
See application file for complete search history.

(56) References Cited

U.S. PATENT DOCUMENTS

| 1,440,646 A | * | 1/1923 | Swanson | ................. | B23P 19/06 |
| | | | | | 470/49 |
| 2,509,123 A | * | 5/1950 | Bailey | .................... | B25B 23/141 |
| | | | | | 470/48 |

(Continued)

FOREIGN PATENT DOCUMENTS

| CN | 101959638 | 1/2011 |
| JP | 63-134131 | 6/1988 |

(Continued)

OTHER PUBLICATIONS

Japanese Office Action for Japanese Patent Application No. 2019-076753 dated Feb. 15, 2022.

(Continued)

*Primary Examiner* — Tyrone V Hall, Jr.
(74) *Attorney, Agent, or Firm* — Amin, Turocy & Watson, LLP

(57) ABSTRACT

A fastening device is equipped with a stocker. The stocker has a circular arcuate shape which is curved in a horizontal plane, and accommodates fastening tools in a state of being aligned in a row. The fastening tool that is positioned at a most downstream side of the stocker is supplied to the receiving site by an unloading and supplying device. Furthermore, the fastening tool supplied to the receiving site is screw-rotated by a screw-rotating device that is displaced toward the fastening tool.

6 Claims, 8 Drawing Sheets

(51) Int. Cl.
*B23Q 3/00* (2006.01)
*B23Q 7/04* (2006.01)
*B23Q 7/14* (2006.01)

(56) References Cited

U.S. PATENT DOCUMENTS 4,891,879 A    1/1990   De Lange
8,448,548 B2   5/2013   Kobayashi et al.

FOREIGN PATENT DOCUMENTS

| | | |
|---|---|---|
| JP | 05-057537 | 3/1993 |
| JP | 06-055378 | 3/1994 |
| JP | 2004-314243 | 11/2004 |
| JP | 2005-205556 | 8/2005 |

OTHER PUBLICATIONS

Chinese Office Action and Search Report for Chinese Patent Application No. 202010295484.2 dated Feb. 21, 2022.
Chinese Office Action and Search Report for Chinese Patent Application No. 202010295484.2 dated Aug. 3, 2021.

* cited by examiner

FASTENING DEVICE

CROSS-REFERENCE TO RELATED APPLICATION

This application is based upon and claims the benefit of priority from Japanese Patent Application No. 2019-076753 filed on Apr. 15, 2019, the contents of which are incorporated herein by reference.

BACKGROUND OF THE INVENTION

Field of the Invention

The present invention relates to a fastening device configured to perform fastening by screw-rotating a fastening tool.

Description of the Related Art

Fastening tools such as screws, bolts, nuts, and the like have been widely used as tools for mechanically joining one object to another object. In an assembly factory or the like, an improvement in working efficiency has been sought, by using a fastening device that automatically screw-rotates such fastening tools. As disclosed in Japanese Laid-Open Patent Publication No. 2004-314213, this type of fastening device is equipped with a stocker in which the fastening tools are accommodated, and an unloading and supplying device that supplies the fastening tools from the stocker to a screw-rotating device, wherein the screw-rotating device screw-rotates the fastening tools.

SUMMARY OF THE INVENTION

As can be understood in particular from FIG. 2 of Japanese Laid-Open Patent Publication No. 2004-314213, in the fastening device disclosed in Japanese Laid-Open Patent Publication No. 2004-314213, the stocker and the unloading and supplying device are arranged in a manner so as to be separated from each other in a horizontal direction. Therefore, the fastening device becomes larger in scale, and by such an amount, a restriction is imposed on the installation location where the fastening device is installed.

In this case, the fastening tools descend by their own weight in a supply passage provided from the upwardly positioned stocker to the downwardly positioned unloading and supplying device. Therefore, the posture of the fastening tools becomes unstable, and there is a concern that jamming may occur at a midway location within the supply passage.

A principal object of the present invention is to provide a fastening device that can be made smaller in scale, and which is capable of delivering fastening tools at a stable posture to a receiving site.

According to an embodiment of the present invention, a fastening device is provided, including a stocker in which a plurality of fastening tools are accommodated, an unloading and supplying device configured to individually supply the fastening tools from the stocker to a receiving site, and a screw-rotating device configured to screw-rotate the fastening tools supplied to the receiving site, the fastening device further including:

a displacement device for use with the screw-rotating device, and configured to displace the screw-rotating device in directions to approach toward and separate away from the receiving site;

wherein the stocker has an arcuate shape that is curved in a horizontal plane, and is configured to accommodate the fastening tools in a state of being aligned in a row;

the unloading and supplying device supplies a fastening tool positioned at a most downstream side of the stocker to the receiving site; and the screw-rotating device is displaced by the displacement device for use with the screw-rotating device toward the fastening tool that was supplied to the receiving site, and screw-rotates the fastening tool, whereas after screw-rotation is completed, the screw-rotating device is displaced by the displacement device for use with the screw-rotating device in a direction to separate away from the receiving site.

According to the present invention, the stocker is configured in the form of a device having an arcuate shape which is curved in a horizontal plane. The arcuately shaped stocker is smaller in a longitudinal direction than a straight stocker. By such an amount, it is possible to reduce the size and scale of the fastening device. Accordingly, the degree of freedom in layout of the fastening device is improved.

Further, the fastening tools are accommodated inside the stocker in a state of being aligned in a row. Accordingly, it is possible for the fastening devices to be moved sequentially in a horizontal plane toward the most downstream side of the stocker. Since the posture of the fastening tools is stable within the horizontal plane, it is possible to prevent the fastening tools in the middle of movement thereof from being placed in an unstable posture such as an inclined posture or the like, and therefore, a situation is prevented in which the fastening tools interfere with the inner walls of the stocker and are stopped thereby. Stated otherwise, the fastening tools are easily made to move. Consequently, it is possible to avoid a situation in which the fastening tools become jammed inside the stocker and movement thereof is stalled. As a result, it is possible to enable the fastening process to be efficiently carried out a plurality of times.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a fastening device according to the present invention will be presented and described in detail below with reference to the accompanying drawings. In the following description, the terms "lower", "upper", "left", and "right" correspond to the lower, upper, left, and right directions in each of the drawings. However, such a convention is merely a matter of convenience for the purpose of simplifying the description and facilitating understanding, and it should be understood that in actual use, the fastening device is not limited to any specific posture.

Figure 1:
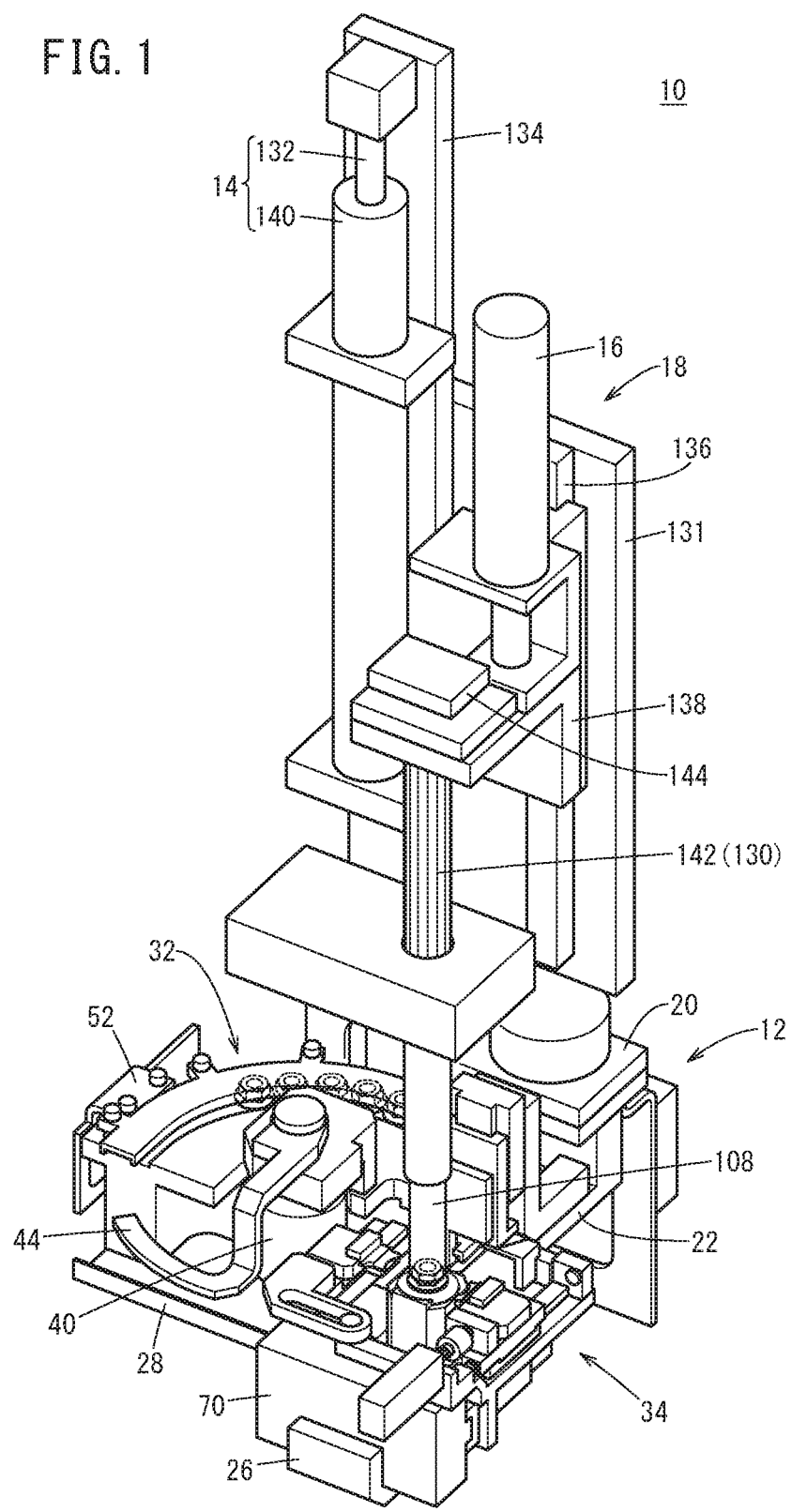
FIG. 1 is a schematic perspective view of principal components of a fastening device according to an embodiment of the present invention.

FIG. 1 is a schematic perspective view of principal components of a fastening device 10 according to a present embodiment. The fastening device 10 includes a supplying and screw-rotating unit 12, and a cylinder support unit 18 that supports a lifting cylinder 14 and a screw-rotating cylinder 16.

Figure 2:
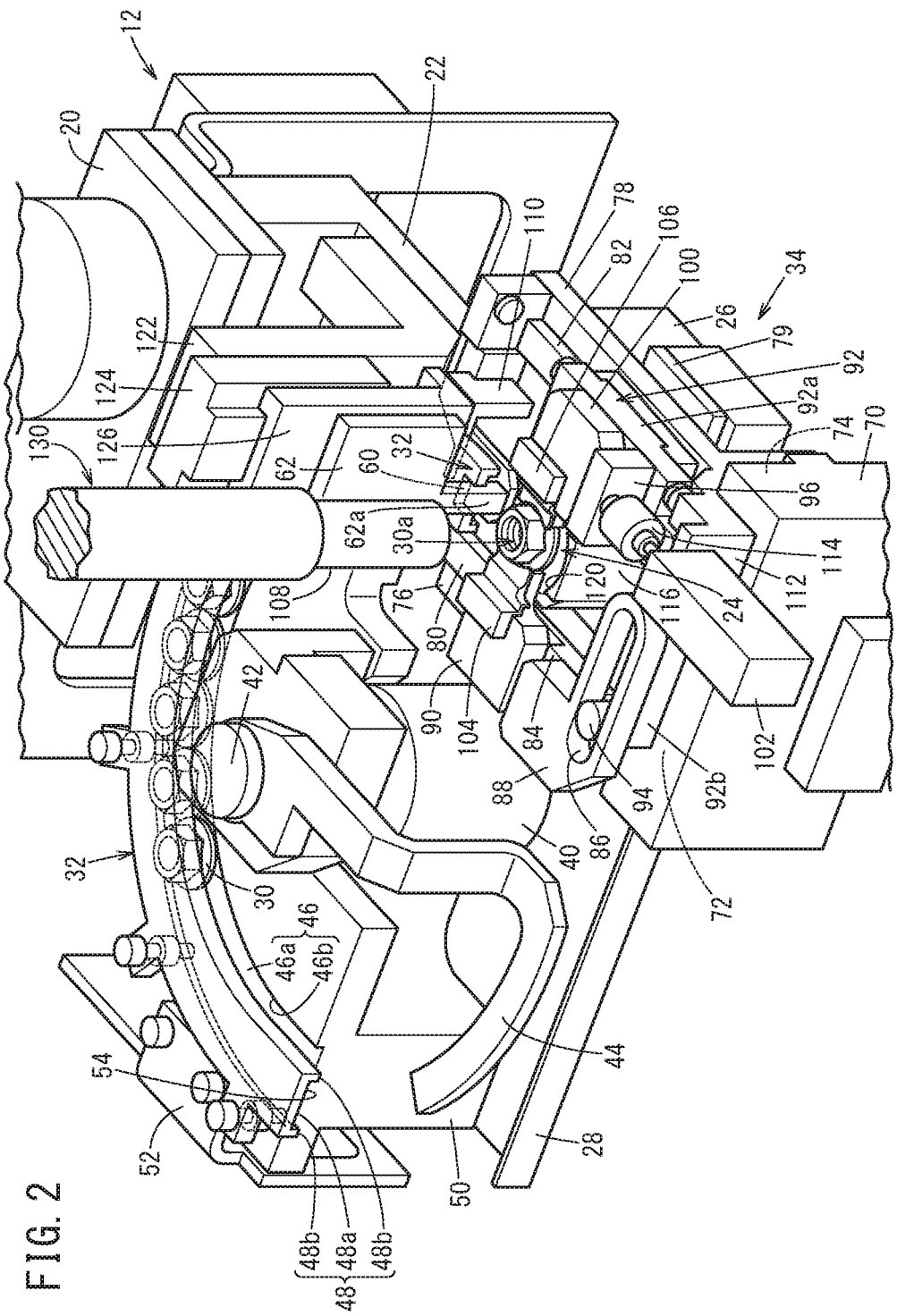
FIG. 2 is an enlarged perspective view of a supplying and screw-rotating unit that constitutes part of the fastening device shown in FIG. 1.

FIG. 2 is an enlarged perspective view of the supplying and screw-rotating unit 12. The supplying and screw-rotating unit 12 and the cylinder support unit 18 are assembled via a base block 20. On the supplying and screw-rotating unit 12, there are provided a first support base 26 supported via a pedestal 22 on the base block 20 and on which there is provided a receiving site 24 at the center thereof, a second support base 28 connected to a left side of the first support base 26, a stocker 32 in which a plurality of flanged nuts 30 that serve as fastening tools are accommodated, and an unloading and supplying device 34 disposed on the first support base 26 and which causes the flanged nuts 30 to move from the stocker 32 to the receiving site 24.

The second support base 28 is connected to the left side of the first support base 26 in the manner described above. A rotary actuator 40 serving as a pressing means is provided on the second support base 28, together with a proximal end of a pressing arm 44 being attached to a rotating rod 42 that makes up the rotary actuator 40. The pressing arm 44 follows the rotation of the rotating rod 42, and rotates about the rotating rod 42 so that a distal end thereof moves from an upstream side to a downstream side of the stocker 32.

The stocker 32 includes a floor member 46 containing a bottom wall 46a that supports the flanged nuts 30 from below and side walls 46b that support the flanged nuts 30 from the sides, and a cover member 48 that covers the flanged nuts 30 from above. Thereamong, one end (an upstream side end part) of the floor member 46 is supported on an upper part of a vertical wall member 50 that is provided in a standing manner on the second support base 28. Further, another end (a downstream side end part) of the floor member 46 is supported on an upper surface of the pedestal 22. On the other hand, the cover member 48 is attached to a bracket 52 disposed on a left side of the vertical wall member 50, in a manner so as to be separated at a predetermined distance from the floor member 46. Therefore, a replenishing port 54 is opened between the left end (upstream side end part) of the floor member 46 and the cover member 48. As will be discussed later, the distal end of the pressing arm 44 enters into the replenishing port 54.

The cover member 48 has two side walls 48b that project or hang down from a ceiling wall 48a. The distance between the side walls 48b and 48b is slightly larger than the width of the heads of the flanged nuts 30. Accordingly, movement of the flanged nuts 30 along the floor member 46 is not hindered by the side walls 48b. Further, the two side walls 48b and 48b serve as side stoppers for preventing the flanged nuts 30 from dropping off from the floor member 46 by coming into abutment with the heads.

The floor member 46 and the cover member 48 exhibit an arcuate shape which is curved at a predetermined curvature in a horizontal plane, and a central angle thereof is about 90°. Accordingly, the plurality of flanged nuts 30 are arranged along the floor member 46 and the cover member 48, or stated otherwise, are arranged in a row so as to be formed in an arcuate shape inside the stocker 32. The flanged nuts 30 move from the left end to the right end of the floor member 46 while being guided along the floor member 46. More specifically, the left end of the floor member 46 and the cover member 48 is an upstream side end part, which is a most upstream part in the direction of movement of the flanged nuts 30, and the right end is a downstream side end part, which is a most downstream part in the direction of movement of the flanged nuts 30. In addition, the movement trajectory of the flanged nuts 30 is formed in an arcuate shape in the same manner as the stocker 32.

Figure 3:
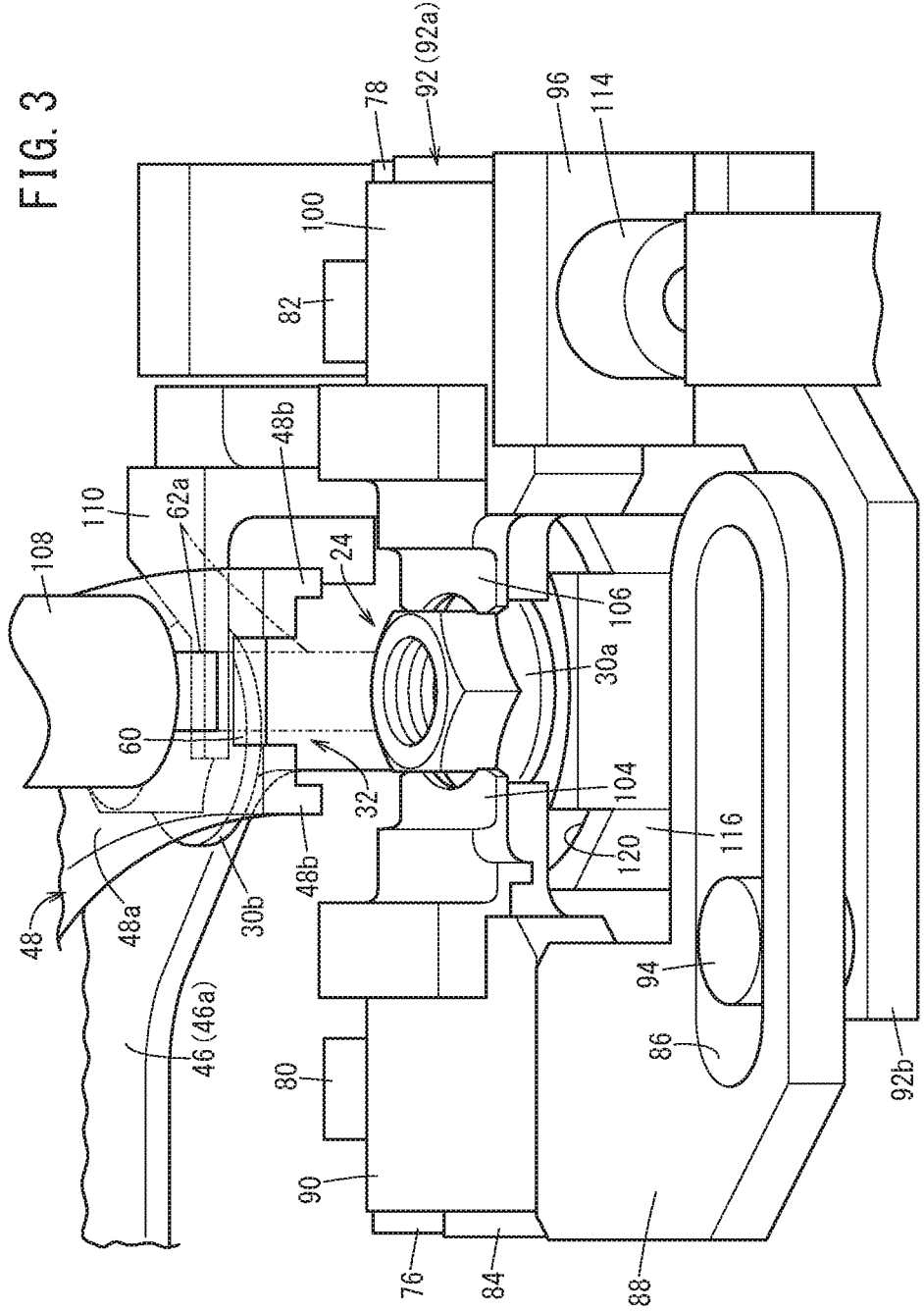
FIG. 3 is an enlarged front view showing the vicinity of a most downstream end part of a stocker.

At the right end, namely, at the downstream side end part of the cover member 48, a concave portion 60 is formed that is recessed toward the upstream side (see FIG. 3). A downwardly hanging projection 62a of a downstream side stopper 62 (most downstream side fastening tool stopper), which will be described later, enters in a retractable manner into the concave portion 60.

An air chuck 70 is supported on one side surface of the first support base 26. The air chuck 70 constitutes the unloading and supplying device 34, and includes a first slider 72 and a second slider 74, which are displaced along a horizontal direction (left/right direction). A first table 76 and a second table 78 which extend to a side in close proximity to the receiving site 24 are connected respectively to the first slider 72 and the second slider 74. The first table 76 and the second table 78 are separated or brought into proximity to each other accompanying displacement of the first slider 72 and the second slider 74 in directions to approach or separate away from each other. At this time, the first table 76 and the second table 78 slide on a table guide rail 79.

A first bed guide rail 80 and a second bed guide rail 82 are laid out respectively on the first table 76 and the second table 78. A first bed 84 is slidably disposed on the first bed guide rail 80. An L-shaped arm 88 shaped substantially in the form of the letter L and in which an elongate guide slot 86 is formed, and a first gripping claw 90 serving as a gripping member are positioned and fixed on the first bed 84. On the other hand, a main body portion 92a of a second bed 92 is slidably disposed on the second bed guide rail 82. A guide member 92b which is bent toward the L-shaped arm 88 projects from the main body portion 92a. It is a matter of course that the guide member 92b is displaced integrally with the main body portion 92a. A cam follower 94 is disposed on the upper surface of the guide member 92b. The cam follower 94 is inserted into the elongate guide slot 86.

On the other hand, a rod receiving member 96 shaped substantially in the form of a quadrangular prism is provided in a standing manner on the upper surface of the main body portion 92a, and a second gripping claw 100 serving as a gripping member is positioned and fixed at a location facing toward the first gripping claw 90. The first gripping claw 90 and the second gripping claw 100, together with the air chuck 70 and a later-described air cylinder 102, constitute the unloading and supplying device 34.

Accompanying displacement of the first slider 72 and the second slider 74 in directions to separate or come in proximity to each other, the first gripping claw 90 and the second gripping claw 100 are separated or brought into proximity with each other integrally together with the first table 76 and the second table 78. The first gripping claw 90 and the second gripping claw 100, when in a separated state, are in an open state in which the flanged nuts 30 are released. In contrast thereto, the first gripping claw 90 and the second gripping claw 100, when in a state of close proximity, are in a closed state in which the flanged nuts 30 are held and restrained.

A first withdrawing claw 104 is provided on an upper surface of the first gripping claw 90, and a second withdrawing claw 106 is provided on an upper surface of the second gripping claw 100. When the flanged nut 30 is raised integrally with a socket 108 without being screw-engaged with the bolt regardless of having been screw-rotated, the first withdrawing claw 104 and the second withdrawing claw 106 serve as withdrawal assisting members that assist the withdrawal of the flanged nut 30 from the socket 108.

An upstream side stopper 110 that serves as an upstream side fastening tool stopper is provided on an upper surface of the second table 78, so as to be in close proximity to one end of the second bed guide rail 82 on a side separated away from the air chuck 70. The upstream side stopper 110 is not disposed on the second bed guide rail 82, and accordingly, is not displaced along the second bed guide rail 82. On the other hand, when the second table 78 approaches toward or separates away from the first table 76, the upstream side stopper 110 is displaced integrally with the second table 78. The direction in which the upstream side stopper 110 is displaced is the same as the direction of displacement of the second gripping claw 100.

When the first gripping claw 90 and the second gripping claw 100 are in a closed state, the upstream side stopper 110 enters between the flanged nut 30 that is positioned at the most downstream side of the stocker 32 and the flanged nut 30 that is positioned one before (on the upstream side of) the most downstream side (see FIG. 3). Hereinafter, in order to simplify the description and facilitate understanding, the flanged nut 30 positioned at the most downstream side will be referred to as a "most downstream side nut", and the flanged nut 30 that is one before this nut will be referred to as an "upstream side nut", and the respective reference numerals 30a and 30b will be used therefor. Moreover, when the first table 76 and the second table 78 are displaced in directions to separate away from each other, the upstream side stopper 110 is retracted from between the most downstream side nut 30a and the upstream side nut 30b.

As will be discussed later, even when the first gripping claw 90 and the second gripping claw 100 which are in the closed state are displaced in directions to deliver a nut to the receiving site 24 while the most downstream side nut 30a is being restrained, the upstream side stopper 110 remains stopped in place without undergoing displacement. Therefore, the upstream side nut 30b is prevented from dropping off from the downstream side end part of the stocker 32 while the most downstream side nut is being delivered.

A stay 112 is connected to the second slider 74 so as to project to a side separated away from the receiving site 24. The air cylinder 102 (gripping member displacement device) for causing the first gripping claw 90 and the second gripping claw 100 to be displaced together with the first bed 84 and the second bed 92 is fixed to the stay 112. A distal end of a displacement rod 114, which makes up part of the air cylinder 102, is connected to the rod receiving member 96.

When the displacement rod 114 is advanced, the first bed 84 and the second bed 92 are displaced in a direction to approach toward a downstream side end part of the floor member 46 and the cover member 48 that constitute the stocker 32. In contrast thereto, when the displacement rod 114 is retracted, the first bed 84 and the second bed 92 are displaced in a direction to separate away from the downstream side end part of the floor member 46 and the cover member 48, and to approach toward the receiving site 24. At the same time, the first gripping claw 90 and the second gripping claw 100 are displaced in the same direction as the first bed 84 and the second bed 92.

A cylindrical portion 116 provided on the first support base 26 is interposed between the first bed 84 and the second bed 92. The receiving site 24 is located on an upper opening of a through hole 120 that is formed in the cylindrical portion 116. Moreover, a lower opening of the through hole 120 faces toward bolts (none of which are shown) that are passed through bolt holes of two workpieces that perform mechanical joining.

An L-shaped holder 122 shaped substantially in the form of the letter L as viewed from the side is disposed on the pedestal 22. A linear guide 124 for use with the stopper is retained by the holder 122. An elevating slider 126 which is capable of sliding in a vertical direction is provided on the linear guide 124 for use with the stopper. The downstream side stopper 62 (most downstream side fastening tool stopper) is attached to an end surface of the elevating slider 126. The downstream side stopper 62 includes the hanging projection 62a. Accompanying raising or lowering of the elevating slider 126, the hanging projection 62a enters into or is retracted out of the concave portion 60 that is formed in the cover member 48.

The socket 108 of a nut runner 130 faces toward the upper side of the through hole 120 of the cylindrical portion 116, or in other words, toward the upper side of the receiving site 24. The nut runner 130 receives the flanged nut 30 (the delivered most-downstream-side nut 30a) at the receiving site 24, and functions as a screw-rotating device for screw-rotating the flanged nut 30 onto the bolt.

An upper support frame 131 is arranged on the cylinder support unit 18 (see FIG. 1). A support column 134 that supports a lifting rod 132 of the lifting cylinder 14 is provided on the upper support frame 131, and on the right side thereof, a cylinder linear guide 136 is provided that guides the screw-rotating cylinder 16 in the vertical direction. The screw-rotating cylinder 16 is supported on a guiding slider 138 that slides along the cylinder linear guide 136.

A cylinder tube 140 of the lifting cylinder 14 is connected to the guiding slider 138. Accordingly, when the cylinder tube 140 is raised or lowered accompanying retraction or advancement of the lifting rod 132, the guiding slider 138 is displaced, and more specifically, is raised and lowered along the cylinder linear guide 136. Integrally with such raising and lowering, the screw-rotating cylinder 16 is raised and lowered therewith.

A shaft 142 of the nut runner 130 is rotatably supported by the guiding slider 138 through a bearing 144. The shaft 142 and a screw-rotating rod of the screw-rotating cylinder 16 are connected via non-illustrated gears, and therefore, the shaft 142 rotates accompanying rotation of the screw-rotating cylinder 16. Integrally with such rotation, the socket 108 rotates therewith.

The nut runner 130 is raised and lowered accompanying raising and lowering of the guiding slider 138. Ultimately, the lifting cylinder 14 serves as a displacement device for use with the screw-rotating device, and which raises and lowers (displaces) the nut runner 130 via the guiding slider 138.

The fastening device 10 which is configured in the manner described above can be used as a so-called stationary type fastening device. Alternatively, the fastening device 10 may be provided on a distal end arm of an articulated robot.

The fastening device 10 according to the present embodiment is basically configured in the manner described above. Operations and effects thereof will be described next in relation to operations of the fastening device 10. Unless otherwise specified, the following operations are carried out automatically by a sequence control.

Before screw-engagement of the flanged nuts 30 is started, the first gripping claw 90 and the second gripping claw 100 are placed in a state of being opened apart from each other, and the hanging projection 62a of the downstream side stopper 62 is moved to a lowered position at which the hanging projection 62a has entered into the concave portion 60 of the cover member 48 (virtual line in FIG. 3). Although the displacement rod 114 of the air cylinder 102 may be at either one of the advanced position or the retracted position, since the displacement rod 114 is in an advanced position when the most downstream side nut 30a is gripped, it is preferable for the displacement rod 114 to be in the advanced position at this time. This is because, in this case, no time is required for the displacement rod 114 to be extended from the retracted position to the advanced position at the time of gripping.

The flanged nuts 30 are supplied, for example, from a non-illustrated parts feeder, via the replenishing port 54 between the floor member 46 and the cover member 48 that constitute the stocker 32. Alternatively, after an operator has removed the cover member 48 from the floor member 46, the flanged nuts 30 may be sequentially placed on the floor member 46. Then, after placement of all of the flanged nuts 30 is completed, the cover member 48 may be reattached.

In this instance, the floor member 46 and the cover member 48 both exhibit an arcuate shape. In this case, the length of the stocker 32 in a longitudinal direction along the horizontal direction can be set to be smaller than that of a stocker having a linear shape. By such an amount, it is possible to reduce the size and scale of the fastening device 10.

After a predetermined number of the flanged nuts 30 have been accommodated in the stocker 32, the rotating rod 42 of the rotary actuator 40 is rotated, and the distal end of the pressing arm 44 is inserted from the replenishing port 54 between the floor member 46 and the cover member 48. The distal end of the pressing arm 44 presses against the flanged nut 30 that is located at the most upstream position. The pressing force thereof is transmitted to the most downstream side nut 30a via the flanged nuts 30 lying adjacent thereto. Accordingly, a force in a direction to deliver the flanged nuts 30 from the downstream side end of the floor member 46 and the cover member 48 to the receiving site 24 acts on the most downstream side nut 30a.

At this point in time, since the hanging projection 62a of the downstream side stopper 62 is at the lowered position, the most downstream side nut 30a is blocked by the hanging projection 62a. Accordingly, a situation is prevented in which the most downstream side nut 30a is delivered to the receiving site 24, or stated otherwise, the most downstream side nut 30a is prevented from falling out from the stocker 32. Moreover, the respective heads of all of the flanged nuts 30 are sandwiched between the two side walls 48b of the cover member 48 as has been described above, and the respective flange portions thereof are sandwiched between the side walls 46b of the floor member 46. Therefore, the flanged nuts 30 are also prevented from dropping off from the sides of the floor member 46 and the cover member 48.

Figure 4:
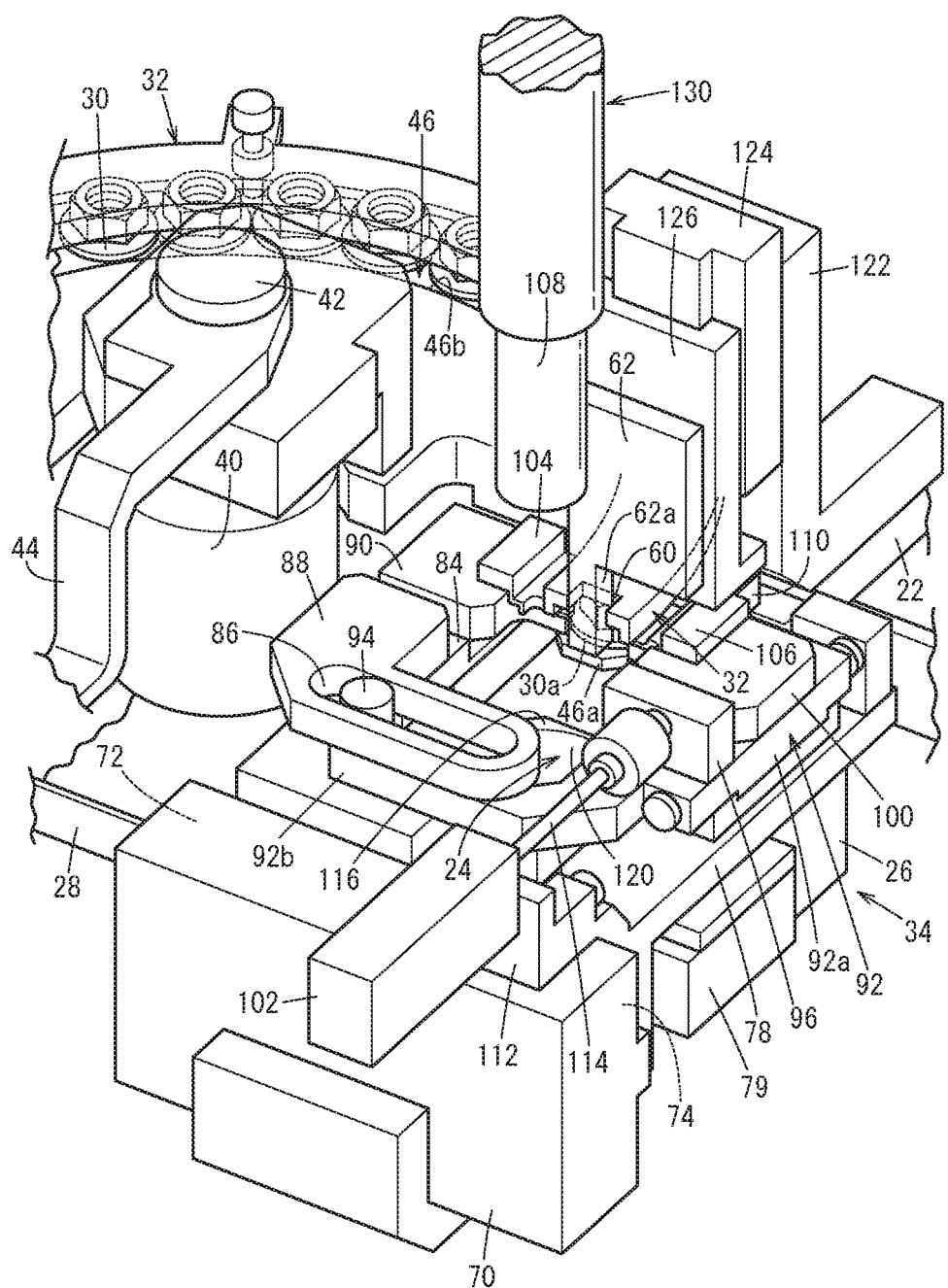
FIG. 4 is an enlarged perspective view of principal components showing a state in which an unloading and supplying device sandwiches (grips) a flanged nut serving as a fastening tool positioned at the most downstream side of the stocker.

When a description is provided illustrating a case in which the displacement rod 114 of the air cylinder 102 is already in the advanced position, next, the air chuck 70 is operated, whereupon the first slider 72 and the second slider 74 are displaced in directions to be brought into proximity to each other. At this time, as shown in FIG. 4, the first table 76, the first bed 84, the L-shaped arm 88, and the first gripping claw 90 are displaced in the same direction integrally with the first slider 72, and together therewith, the second table 78, the second bed 92, the second gripping claw 100, and the upstream side stopper 110 are displaced in the same direction integrally with the second slider 74. Further, the cam follower 94 provided on the guide member 92b of the second bed 92 moves relatively to the left inside the elongate guide slot 86. The first table 76 and the second table 78 are guided by the table guide rail 79.

In the manner described above, the first gripping claw 90 and the second gripping claw 100 are displaced in directions so as to approach toward each other, and are placed in the closed state. As a result, as shown in FIG. 3, the flange portion of the most downstream side nut 30a is gripped from the sides by the first gripping claw 90 and the second gripping claw 100. Further, the upstream side stopper 110 which was displaced in the same direction as the second gripping claw 100 enters between the most downstream side nut 30a and the upstream side nut 30b. Accompanying entry thereof, transmission of the pressing force by the pressing arm 44 to the most downstream side nut 30a is interrupted. It should be noted that the first withdrawing claw 104 and the second withdrawing claw 106 are simply positioned above the flange portion in a state with a predetermined clearance being formed therebetween, and the withdrawing claws do not take part in gripping.

Next, the elevating slider 126 moves up along the linear guide 124 for use with the stopper. Consequently, as shown by the solid line in FIG. 3, the hanging projection 62a of the downstream side stopper 62 is retracted from the concave portion 60 of the cover member 48. More specifically, the most downstream side nut 30a is released from being blocked by the downstream side stopper 62. Moreover, since the most downstream side nut 30a is already gripped between the first and second gripping claws 90 and 100, the most downstream side nut 30a does not fall off from the stocker 32.

Next, the air cylinder 102 is operated, and the displacement rod 114 is retracted. Since the distal end of the displacement rod 114 is connected to the rod receiving member 96, the second bed 92 on which the rod receiving member 96 is provided in a standing manner is pulled toward the side of the air cylinder 102. Therefore, the second bed 92, and the second gripping claw 100 which is disposed on the second bed 92 are displaced along the second bed guide rail 82 toward the side of the air cylinder 102. Moreover, the upstream side stopper 110 is disposed on the second table 78, and is not disposed on the second bed 92. Therefore, even if the second bed 92 is displaced in the above-described manner, the upstream side stopper 110 is not displaced and remains between the most downstream side nut 30a and the upstream side nut 30b.

When such displacement takes place, the L-shaped arm 88 is pulled toward the side of the air cylinder 102, and furthermore, the first bed 84 on which the L-shaped arm 88 is provided is pulled toward the side of the air cylinder 102. Ultimately, the first bed 84, and the first gripping claw 90 which is disposed on the first bed 84 are displaced along the first bed guide rail 80 toward the side of the air cylinder 102.

In the foregoing manner, as a result of the first gripping claw 90 and the second gripping claw 100 being displaced toward the side of the air cylinder 102, the most downstream side nut 30a, which is gripped between the first gripping claw 90 and the second gripping claw 100, is delivered from the stocker 32, and is positioned directly above the upper opening of the through hole 120 that is formed in the cylindrical portion 116, and more specifically, is positioned at the receiving site 24. Moreover, as noted above, the upstream side stopper 110 is positioned downstream of the upstream side nut 30b, and blocks the upstream side nut 30b. Therefore, the upstream side nut 30b is prevented from being pressed out in accordance with the pressing force of the pressing arm 44, and from falling out from the stocker 32.

Thereafter, the elevating slider 126 moves down along the linear guide 124 for use with the stopper. As a result, the hanging projection 62a of the downstream side stopper 62 enters into the concave portion 60 of the cover member 48.

Figure 5:
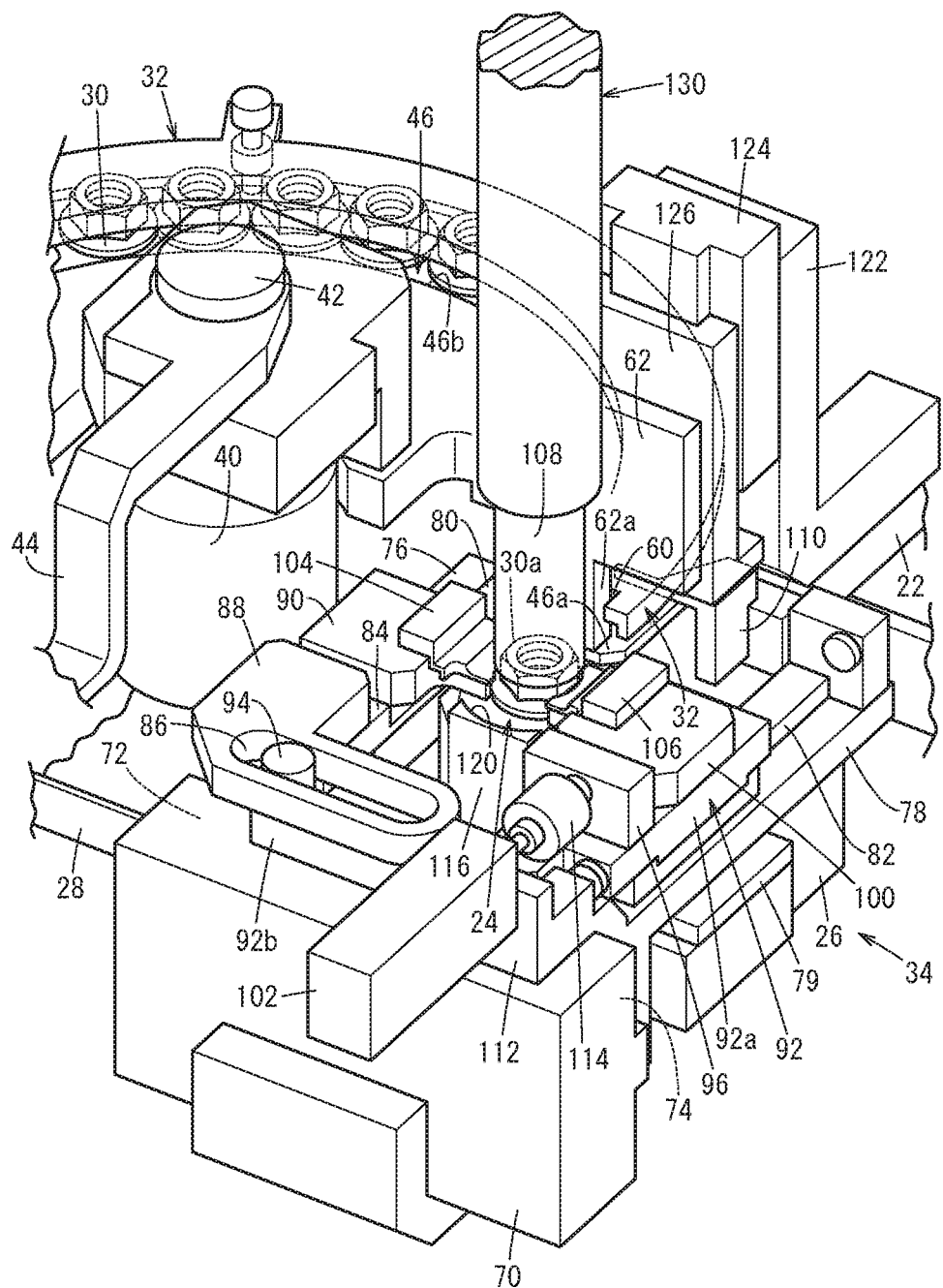
FIG. 5 is an enlarged perspective view of principal components showing a state in which a socket of a nut runner serving as a screw-rotating device is lowered from the state shown in FIG. 4, and a flanged nut is retained thereby.

Simultaneously with lowering of the downstream side stopper 62, the lifting rod 132 of the lifting cylinder 14 is advanced. Along therewith, the cylinder tube 140 of the lifting cylinder 14 is relatively lowered, and the guiding slider 138 descends integrally along the cylinder linear guide 136. In following relation therewith, the screw-rotating cylinder 16 and the nut runner 130 descend. The socket 108 of the nut runner 130 descends toward the receiving site 24, and as shown in FIG. 5, receives the most downstream side nut 30a. More specifically, the most downstream side nut 30a is retained by the socket 108. In this manner, in the present embodiment, the receiving site 24 is arranged downwardly of the socket 108 in the raising and lowering direction. More specifically, the lowered position of the socket 108 and the receiving site 24 are made to correspond with each other. Therefore, the most downstream side nut 30a can be received simply by causing the socket 108 to descend, and in this way, the size and scale of the fastening device 10 can be reduced.

Figure 6:
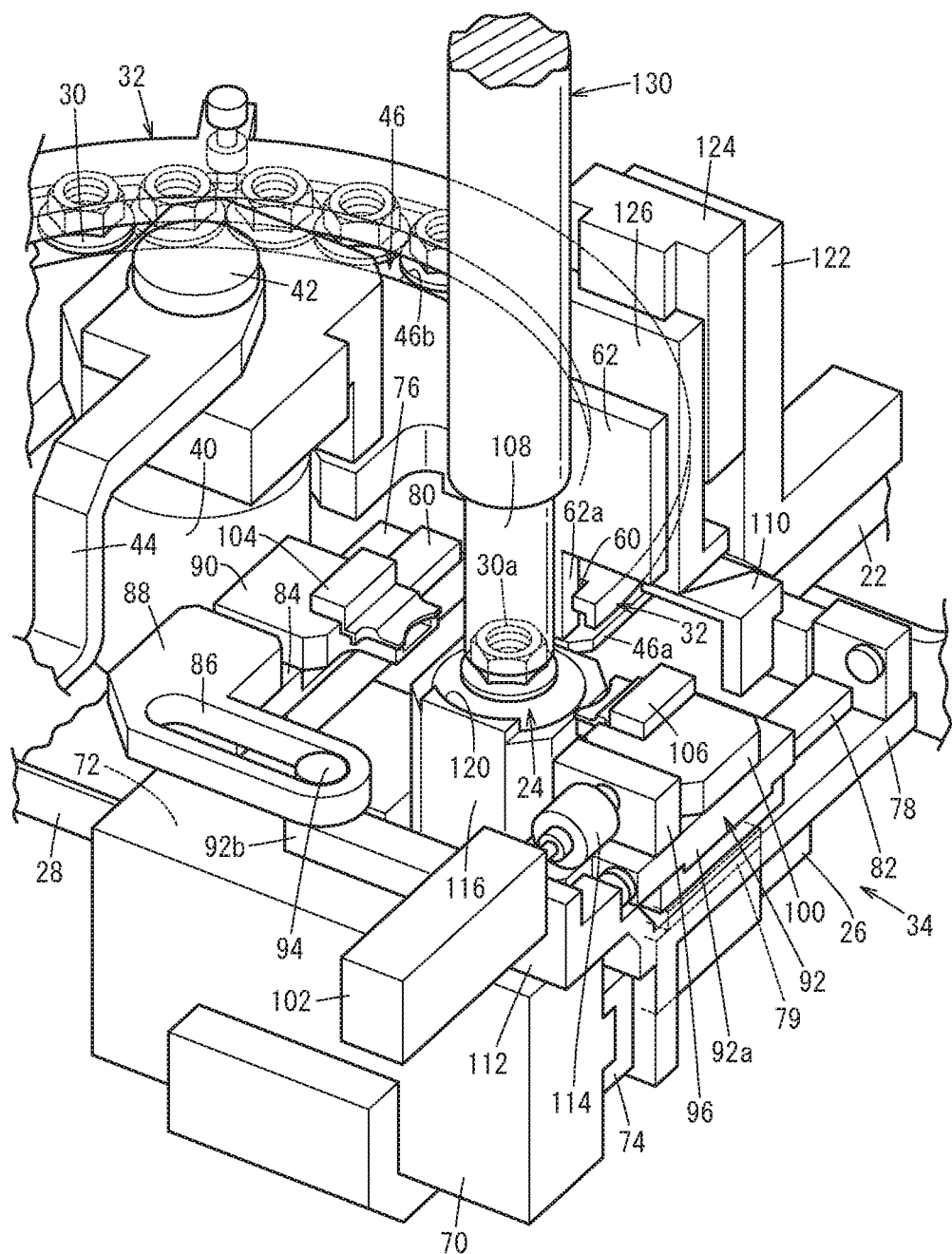
FIG. 6 is an enlarged perspective view of principal components showing a state in which the unloading and supplying device has released the flanged nut from the state shown in FIG. 5.

When the most downstream side nut 30a has been retained by the socket 108, the air chuck 70 is operated, and the first slider 72 and the second slider 74 are displaced in directions to separate away from each other. At this time, as shown in FIG. 6, the first table 76, the first bed 84, the L-shaped arm 88, and the first gripping claw 90 are displaced in the same direction integrally with the first slider 72, and together therewith, the second table 78, the second bed 92, the second gripping claw 100, and the upstream side stopper 110 are displaced in the same direction integrally with the second slider 74.

In the manner described above, the first gripping claw 90 and the second gripping claw 100 are displaced in directions to separate away from each other, and are placed in the open state. At this time, the cam follower 94 moves relatively to the right inside the elongate guide slot 86. The first gripping claw 90 and the second gripping claw 100 come to a stop by the air chuck 70 arriving at its end of operation.

At the same time as the first gripping claw 90 and the second gripping claw 100 being displaced in directions to separate away from each other, the upstream side stopper 110 is displaced in a direction away (to be retracted) from the upstream side nut 30b. The pressing force of the pressing arm 44 is sequentially transmitted to the upstream side nut 30b from the flanged nut 30 that is positioned on the most upstream side. Therefore, the upstream side nut 30b is pressed to the downstream side, and is positioned at the most downstream side of the stocker 32. More specifically, the upstream side nut 30b becomes a new most downstream side nut 30a. In this manner, by the pressing force being applied by the pressing arm 44 in the direction of movement from the upstream side to the downstream side with respect to the nut positioned on the most upstream side of the flanged nuts 30 that are aligned along the stocker 32, then after the most downstream side nut 30a has been delivered to the receiving site 24, the flanged nuts 30 can be pressed and moved sequentially to the downstream side.

According to the present embodiment, the stocker 32 is provided so as to form an arcuate shape in the horizontal plane. In addition, the flanged nuts 30 are aligned in a row inside the stocker 32, and in this state, by the most upstream side nut being pressed, the flanged nuts 30 are moved downstream. Therefore, the flanged nuts 30 move inside the stocker 32 in a state in which the posture thereof is stable. As a result, it is possible to avoid a situation in which the flanged nuts 30 become inclined inside the stocker 32, and movement thereof becomes difficult due to being caught on the inner wall, or in other words, due to jamming.

Further, according to the present embodiment, the rotary actuator 40 that causes the pressing arm 44 to rotate is disposed between the arcuately shaped stocker 32 and the receiving site 24. Therefore, since formation of a so-called dead space between the stocker 32 and the receiving site 24 is avoided, the size and scale of the fastening device 10 can be further reduced.

Moreover, at the time that the upstream side nut 30b is moved and becomes the new most downstream side nut 30a, the hanging projection 62a of the downstream side stopper 62 is already in the lowered position. Accordingly, the new most downstream side nut 30a is blocked by the hanging projection 62a. Consequently, the new most downstream side nut 30a is prevented from falling out from the stocker 32.

Figure 7:
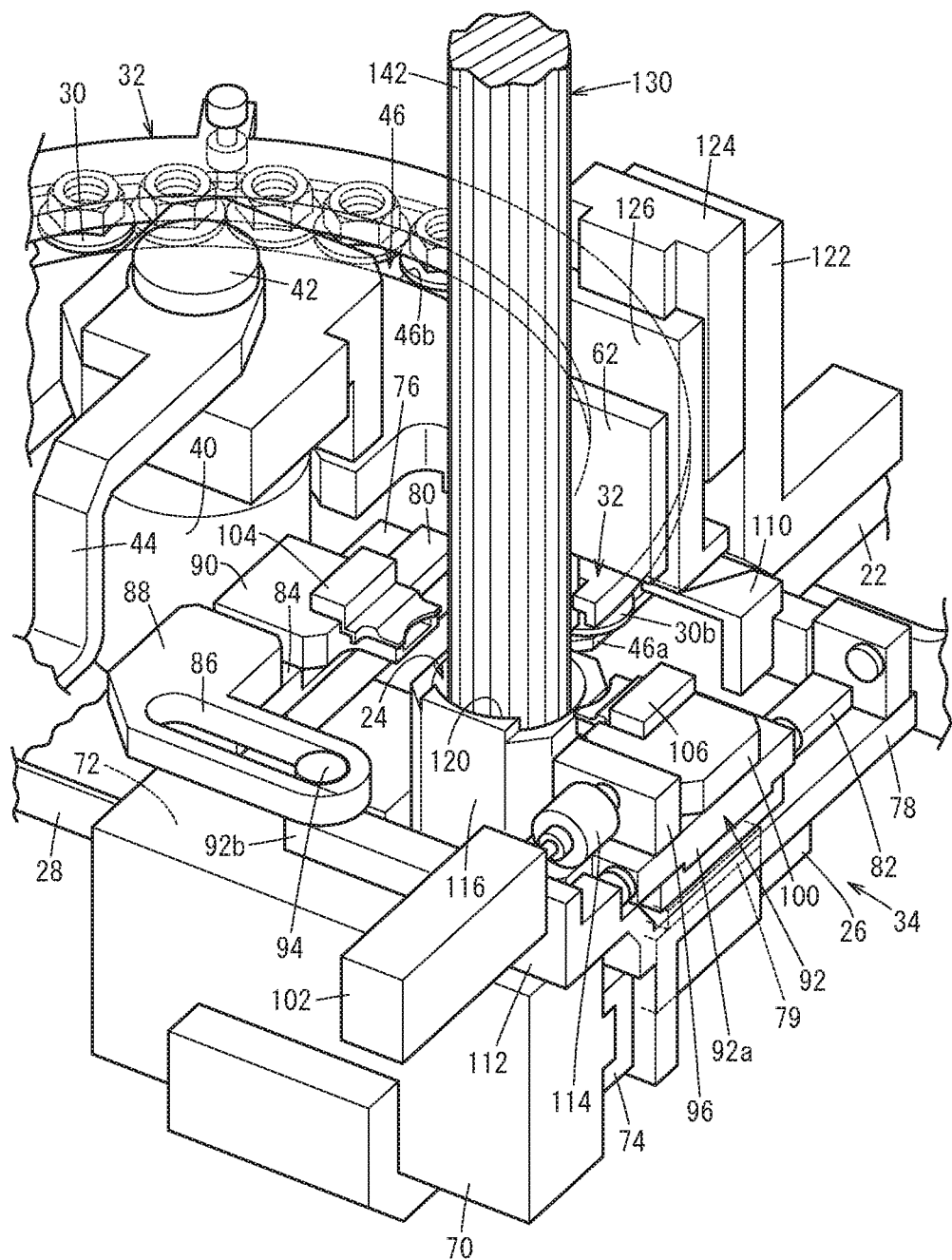
FIG. 7 is an enlarged perspective view of principal components showing a state in which a nut runner is further lowered from the state shown in FIG. 6 in order for the flanged nut to be screw-engaged.

Along with the first gripping claw 90 and the second gripping claw 100 being placed in the open state, the flanged nut 30 (the most downstream side nut 30a that was delivered to the receiving site 24) is released from being restrained by the first gripping claw 90 and the second gripping claw 100. More specifically, at this point in time, only a magnet inside the socket 108 restrains the flanged nut 30. In this state, the lifting rod 132 of the lifting cylinder 14 is further advanced, whereby as shown in FIG. 7, the socket 108 and the flanged nut 30 are placed in proximity to a bolt positioned in the vicinity of the lower opening of the through hole 120 that is formed in the cylindrical portion 116. By the socket 108 being further lowered, a distal end of the bolt is passed through a threaded hole of the flanged nut 30.

Next, the screw-rotating rod of the screw-rotating cylinder 16 is rotated. The rotation thereof is transmitted via gears to the shaft 142 of the nut runner 130, and as a result, the shaft 142 is rotated. Of course, the socket 108 follows the shaft 142 and rotates integrally therewith, together with the flanged nut 30 retained by the socket 108 being rotated. More specifically, the flanged nut 30 is screw-rotated, and in accordance therewith, is screw-rotated onto the bolt. While the socket 108 in which the flanged nut 30 is retained descends and performs screw-rotation, as shown in FIG. 7, the first gripping claw 90 and the second gripping claw 100 assume a standby state at positions and in an open state in which the most downstream side nut 30a is released at the receiving site 24.

When lowering of the screw-rotating rod of the screw-rotating cylinder 16 is completed, screw-rotation of the nut runner 130 (screw-rotation of the flanged nut 30 onto the bolt) is brought to an end. Consequently, mechanical joining of the workpieces is completed.

A situation will be assumed in which the flanged nut 30 is not screw-rotated onto the bolt, and rises together with the socket 108. Thus, according to the present embodiment, an operation of gripping such a non-threaded flanged nut 30 again by the first gripping claw 90 and the second gripping claw 100 is performed.

After such screw-rotation is completed, the lifting rod 132 of the lifting cylinder 14 is retracted, and the cylinder tube 140 is relatively raised, and together therewith, the guiding slider 138 rises integrally along the cylinder linear guide 136. Accordingly, the screw-rotating cylinder 16 and the nut runner 130 are raised, and the socket 108 is retracted from the bolt. The nut runner 130 is temporarily stopped at the position where the socket 108 has received the most downstream side nut 30a. Specifically, the same state as that shown in FIG. 6 is obtained.

Next, the air chuck 70 is operated, and the first gripping claw 90 and the second gripping claw 100 approach toward each other and are placed in the closed state. In the case that the flanged nut 30 has been raised together with the socket 108 without being screw-rotated onto the bolt, at this point in time, the flanged nut 30 is gripped again from the sides by the first gripping claw 90 and the second gripping claw 100. Specifically, the same state as that shown in FIG. 5 is obtained.

Next, in the same manner as described above, the nut runner 130 is further raised. At this time, the flanged nut 30 held by the socket 108 also rises slightly, however, the flange portion thereof abuts against the first withdrawing claw 104 and the second withdrawing claw 106, whereby further raising thereof is prevented. More specifically, the flanged nut 30 is blocked by the first withdrawing claw 104 and the second withdrawing claw 106. As a result, the flanged nut 30 is easily and stably withdrawn (detached) from the socket 108. In this manner, the first withdrawing claw 104 and the second withdrawing claw 106 assist in the withdrawal of the flanged nut 30 from the nut runner 130.

Thereafter, the air chuck 70 is operated, and the first gripping claw 90 and the second gripping claw 100 are separated away from each other and are placed in the open state. Consequently, the flanged nut 30 is released completely from the socket 108, the first gripping claw 90, and the second gripping claw 100, and drops under its own weight so as to pass through the through hole 120. The dropped flanged nut 30 may be recovered. Moreover, although the above operation is performed in a similar manner to the case in which the flanged nut 30 is screw-engaged onto the bolt, in this case, the flanged nut 30 is not raised together with the socket 108. Accordingly, the flanged nut 30 is not gripped again by the first gripping claw 90 and the second gripping claw 100, and recovery thereof is not performed.

While this operation is carried out, the posture or the position of the workpiece is changed below the receiving site 24, in a manner so as to position the bolt on which the new most downstream side nut 30a should be screw-engaged. In the case that the fastening device 10 is provided on an articulated robot, an arm of the articulated robot may be appropriately rotated.

Figure 8:
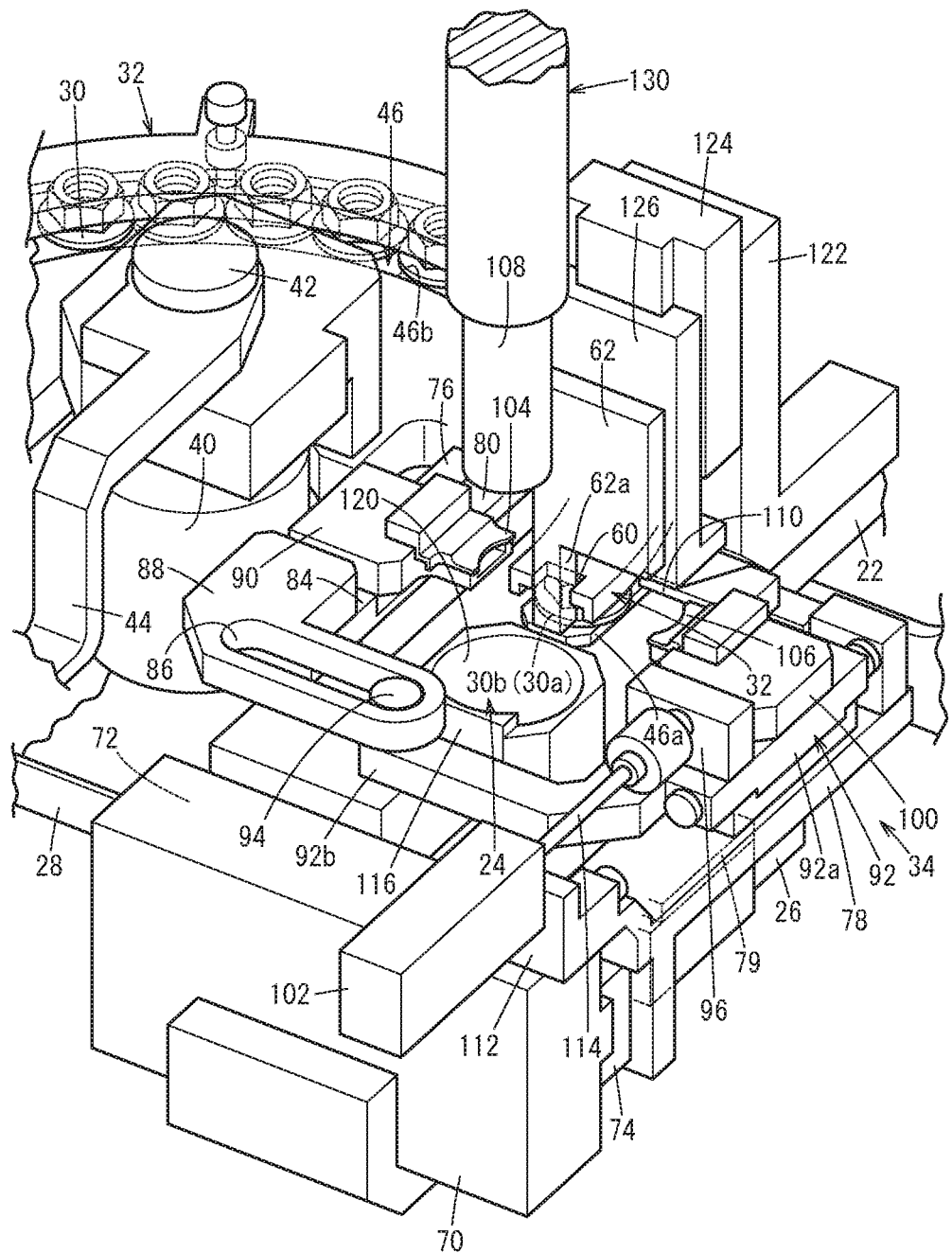
FIG. 8 is an enlarged perspective view of principal components showing a state in which the unloading and supplying device is advanced toward a most downstream end part of the stocker in order to deliver a new flanged nut.

In order to perform delivery the next time, the air cylinder 102 is operated and advances the displacement rod 114. Following the advancement thereof, the second bed 92 is separated away from the receiving site 24 along the second bed guide rail 82, and is displaced in a direction to approach toward the most downstream side of the stocker 32. Further, the first bed 84 is displaced along the first bed guide rail 80 in the same direction as the second bed 92. As a result, as shown in FIG. 8, the first gripping claw 90 and the second gripping claw 100, while remaining in the open state, are placed in a position where they face toward each other with the new most downstream side nut 30a interposed therebetween.

Furthermore, the air chuck 70 is operated, and the first gripping claw 90 and the second gripping claw 100 are placed in the closed state. More specifically, the first gripping claw 90 and the second gripping claw 100 grip the new most downstream side nut 30a. Consequently, the state shown in FIG. 4 is formed. Moreover, simultaneously with the first gripping claw 90 and the second gripping claw 100 gripping the new most downstream side nut 30a, it is a matter of course that the upstream side stopper 110 enters between the most downstream side nut 30a and the upstream side nut 30b.

Thereafter, the new most downstream side nut 30a is screw-engaged with the bolt in the same manner as described above. When some of the flanged nuts 30 accommodated in the stocker 32 have been delivered and the number of the remaining flanged nuts 30 becomes a predetermined number (including zero), new flanged nuts 30 are supplied to the stocker 32 through the replenishing port 54. More specifically, the rotating rod 42 of the rotary actuator 40 rotates in a direction opposite to the direction when the flanged nuts 30 are pressed, and the pressing arm 44 is withdrawn from the interior of the stocker 32 via the replenishing port 54. Consequently, the replenishing port 54 is opened, together with the flanged nuts 30, which are supplied from the parts feeder, being fed and introduced through the replenishing port 54.

The replenishing port 54 is positioned substantially in the same horizontal plane as the receiving site 24, together with being formed at a position that is offset with respect to the receiving site 24. Accordingly, it is made easy for the parts feeder and the like to be connected to the replenishing port 54, while a reduction in the size and scale of the fastening device 10 can be achieved.

The present invention is not limited in particular to the above-described embodiment, and various modifications can be made thereto without departing from the essence and gist of the present invention.

For example, the fastening tools accommodated in the stocker 32 may be bolts. In this case, a guide hole through which shank portions of the bolts are passed may be formed in the floor member 46 of the stocker 32.

Further, while the nut runner 130 is being screw-rotated, preparations may be made to deliver a new most downstream side nut 30a. More specifically, the air cylinder 102 is controlled so as to operate while the nut runner 130 is being screw-rotated, and the displacement rod 114 is made to advance. Thereafter, the air chuck 70 is operated, and the first gripping claw 90 and the second gripping claw 100 are placed in the closed state.

More specifically, while the mechanical connection is being performed by the nut runner 130, the first gripping claw 90 and the second gripping claw 100 grip the new most downstream side nut 30*a*. Therefore, it is possible to shorten the time required after one of the flanged nuts 30 has been screwed onto a bolt and until screw-engagement of a next flanged nut 30 onto a bolt is started. Stated

What is claimed is:

1. A fastening device comprising a stocker in which a plurality of fastening tools are accommodated, an unloading and supplying device configured to individually supply the fastening tools from the stocker to a receiving site, and a screw-rotating device configured to screw-rotate the fastening tools supplied to the receiving site,
    the fastening device further comprising a displacement device for use with the screw-rotating device, and configured to displace the screw-rotating device in directions to approach toward and separate away from the receiving site;
    wherein the stocker has an arcuate shape that is curved in a horizontal plane, and is configured to accommodate the fastening tools in a state of being aligned in a row;
    the unloading and supplying device supplies a fastening tool positioned at a most downstream side of the stocker to the receiving site;
    the screw-rotating device is displaced by the displacement device for use with the screw-rotating device toward the fastening tool that was supplied to the receiving site, and screw-rotates the fastening tool, whereas after screw-rotation is completed, the screw-rotating device is displaced by the displacement device for use with the screw-rotating device in a direction to separate away from the receiving site; and
    wherein, when the screw-rotating device retains the fastening tool after completion of screw-rotation, the unloading and supplying device retains the fastening device again.

2. The fastening device according to claim 1, wherein a replenishing port configured to replenish a new fastening tool is formed at a most upstream part of the stocker.

3. The fastening device according to claim 1, wherein the unloading and supplying device comprises:
    gripping members configured to grip the fastening tool that is positioned at the most downstream side by being placed in a closed state, while configured to release the fastening tool that is positioned in the receiving site by being placed in an open state; and
    a gripping member displacement device configured to cause the gripping members to be displaced in a manner so that the fastening tool that is gripped by the gripping members arrives at the receiving site;
    the fastening device further comprising an upstream side fastening tool stopper configured to block, at a location upstream of the most downstream side, the fastening tool that is to be newly moved to the receiving site, when the fastening tool positioned at the most downstream side is moved to the receiving site;
    wherein the upstream side fastening tool stopper is moved to a position to block the fastening tool positioned upstream of the most downstream side when the gripping members are placed in the closed state, while moved to a position to release the fastening member positioned upstream of the most downstream side when the gripping members are placed in the open state.

4. The fastening device according to claim 1, further comprising a pressing device configured to press the fastening tools accommodated in the stocker toward the most downstream side.

5. The fastening device according to claim 1, further comprising a most downstream side fastening tool stopper configured to enter into or be retracted from a space between the fastening tool at the most downstream side and the receiving site, and to block the most downstream side fastening tool upon having entered into the space.

6. The fastening device according to claim 1, further comprising a withdrawal assisting member configured to block the fastening device that was retained again by the unloading and supplying device, and to assist withdrawal of the fastening tool from the screw-rotating device.

* * * * *